May 20, 1947.  F. H. BOGART  2,420,855
CHUCK ELECTRIC MOTOR CONTROL
Original Filed June 7, 1941
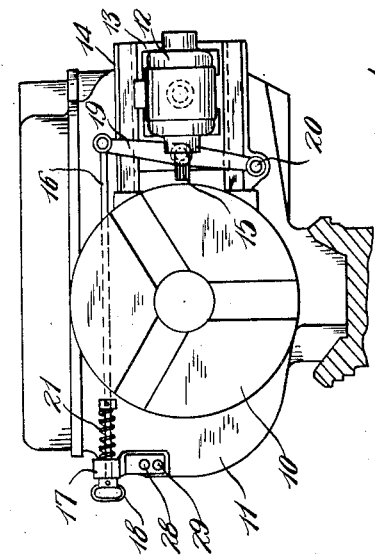
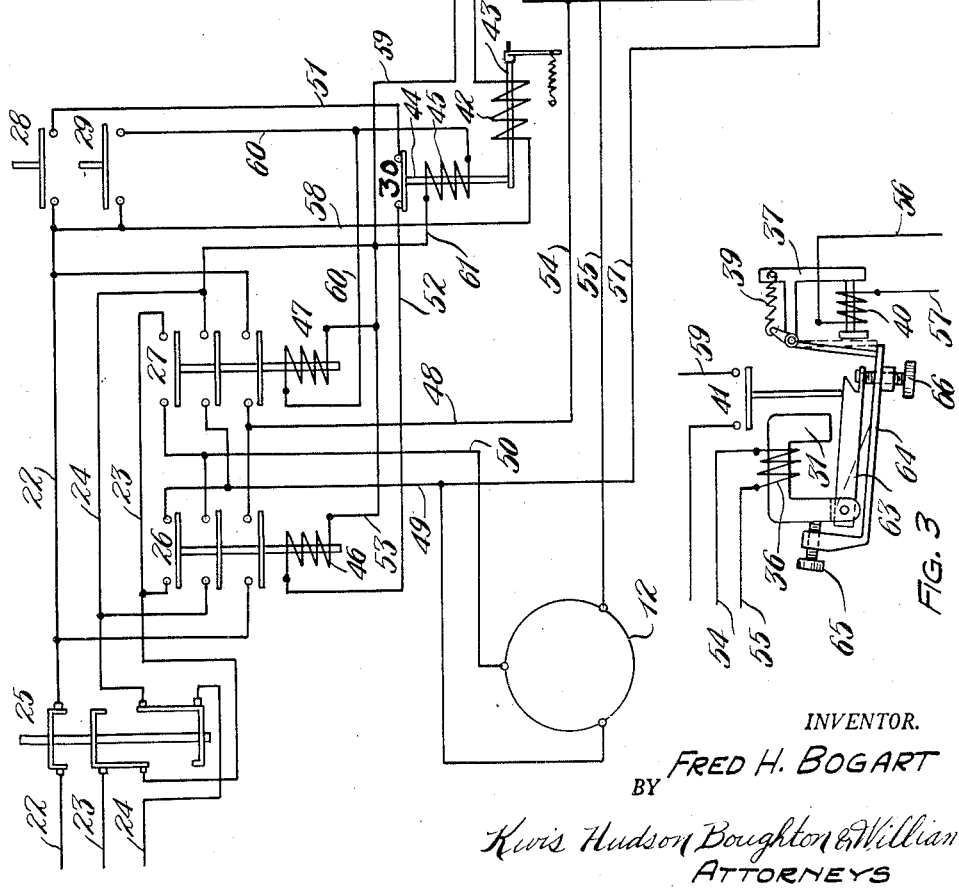
INVENTOR.
FRED H. BOGART
BY
Kwis Hudson Boughton & Williams
ATTORNEYS Patented May 20, 1947

2,420,855

UNITED STATES PATENT OFFICE 2,420,855

CHUCK ELECTRIC MOTOR CONTROL

Fred H. Bogart, South Euclid, Ohio, assignor to The Warner & Swasey Company, Cleveland, Ohio, a corporation of Ohio Original application June 7, 1941, Serial No. 397,145. Divided and this application July 23, 1943, Serial No. 495,833

7 Claims. (Cl. 279—1)

This invention relates to the combination in a power operated chuck of a control for the electric driving motor and is a division of my application Serial No. 397,145, filed June 7, 1941, Work gripping device.

An object of the present invention is to provide in combination with a power operated chuck, a control for the electric driving motor such that the motor will be automatically deenergized when the resistance to the motor operation reaches a predetermined but variable value.

Another object is to provide in combination with a power operated chuck, a control for the electric driving motor such that when the current required to operate the motor against predetermined but variable resistances reaches a predetermined but variable value the motor will be automatically deenergized, together with adjustable means for varying the values at which the motor will be deenergized.

Another object is to provide in combination with a power operated chuck, a control for the electric driving motor such as specified in the last named object and which control includes provision for preventing the actuation of the control to stop the motor when the surge of current which passes through the motor in starting it from rest is greater than the predetermined but variable current at which the motor will be automatically deenergized.

Another object is to provide a control for the electric motor which operates a chuck and which control includes provision for stopping the motor when the pressure of the jaws or gripping means on the part being gripped reaches a predetermined but variable value regardless of whether the nature of the part is such as to require external or internal gripping.

Further and additional objects not hereinbefore specified will become apparent during the detailed description of an embodiment of the invention which is to follow.

In the drawings,

Fig. 1 is a front elevational view of a universal chuck mounted on the work spindle in the headstock of a machine tool, the electric motor for operating said chuck being shown mounted on the end of the headstock.

Fig. 2 is a diagrammatic view of the electrical control embodying the present invention and shows the electrical circuits, the different switches and the unit whereby the motor circuit is automatically opened when the pressure of the chuck jaws on a work piece reaches a predetermined but variable amount, and Fig. 3 is a fragmentary view showing a slightly modified form of unit adapted to be employed in the circuits and with the switches of Fig. 2 in place of the unit shown in Fig. 2.

Referring to Fig. 1 the chuck body 10 is secured in any suitable manner, as is well known in the art, to the rotary work spindle of a machine tool and which spindle is mounted in the headstock 11 of the machine tool as is well known in the art. The chuck is of the universal type and may include a series of radially disposed guideways which have slidably mounted therein reversible work gripping jaws, wherefore said jaws can function to grip a work piece, either externally of the work piece or internally thereof. The mechanism for moving the jaws radially of the chuck in the guideways is not illustrated herein since it may take the form shown and described in detail in my said application Serial No. 397,145, or it may include any other form of suitable operating train as will be well known to those skilled in the art. The electric motor for driving the operating train of the chuck may be built into the chuck body as illustrated in Figs. 13 to 19 inclusive of my said application Serial No. 397,145, or the motor may be mounted exteriorly of the chuck body and operatively connected with the operating train of the chuck in some suitable and desirable manner as, for example, in the manner shown in Figs. 1 to 12 inclusive of my said application Serial No. 397,145.

In Fig. 1 hereof the electric motor for driving the operating train of the chuck is shown as mounted in accordance with the illustration contained in Figs. 1 to 12 inclusive of my said copending application Serial No. 397,145. The motor 12 is mounted externally of the chuck body and is secured to a slide 13 which is mounted for reciprocating or rectilinear movement back and forth toward and away from the chuck in a radial direction. The slide 13 is mounted in the guideway of a bracket 14 which is secured to the headstock 11 in which the work spindle that carries the chuck is rotatably mounted. The movement of the slide 13 toward the chuck may be limited by suitable stop members as may also the movement of the slide outwardly away from the chuck.

The motor shaft projects beyond the motor housing toward the chuck body and at its free end is provided with a pinion 15 which is adapted to slide into meshing engagement with one or more gears carried by the chuck body and forming part of the operative train therein, as fully explained in my said copending application Serial No. 397,145. The slide 13 may be moved backwardly and forwardly to engage and disengage said pinion 15 with respect to said gears in the chuck body by means of a rod 16 slidably supported on the headstock and projecting through a bracket 17 at the front of the headstock. The forward end of the rod 16 is provided with a suitable handle 18 while the rear end of the rod is pivotally connected to the upper end of a lever 19 whose lower end is pivotally supported at 20 on a suitable portion of the bracket 14. The lever 19 intermediate its ends is pivotally connected to the slide 13 so that the forward motion of the rod 16 will rock the lever and shift the slide and motor forwardly so as to cause the pinion 15 to move into operative relation with the gears which it is adapted to drive. A spring 21 surrounds a portion of the rod 16 and is compressed when the rod is moved forwardly and when the operator releases his hold on the handle portion 18 said spring restores the slide, the motor and the rod to their former inoperative positions. The construction heretofore described is fully illustrated in Figs. 1 to 12 inclusive of the drawings of my said copending application Serial No. 397,145 and is explained in detail in the specification thereof and consequently further explanation herein is unnecessary.

The electric motor 12 is of the three phase alternating current type which is preferable in a chuck that is employed as a general purpose chuck wherein work pieces of various types and resistances requiring light, medium or heavy jaw portions thereon may be mounted. Inasmuch as the pressure of the chuck jaws on various types of work pieces may be different it is desirable that provision be made for causing said jaws to grip the work piece with a predetermined but variable degree of pressure. Accordingly a control is provided for the motor 12 whereby the motor circuit is automatically opened and the motor is stopped when the chuck jaws engage the work piece with a predetermined but variable pressure.

As already suggested, the chuck jaws in certain instances may move radially inwardly to grip the work externally while in other instances the jaws may move radially outwardly to grip the work internally. As already stated, the chuck is for use on a machine wherein a large variety of work pieces are to be machined requiring by their nature or construction a light gripping pressure, in some instances, a medium gripping pressure in other instances and still in other instances a high gripping pressure. In other words, the chuck is of universal application and consequently it is desirable that provision be made for limiting the gripping pressure of the jaws to a predetermined but variable amount for each of the various types of work pieces.

In Fig. 2 there is shown a control for the motor 12 which accomplishes this result for causing said motor in the chucking part of the cycle to be stopped when the desired predetermined gripping pressure of the jaws on the work piece is reached, and more particularly in this figure there is shown the control switches and the electric circuits for controlling the three phase motor 12 for both chucking and releasing the jaws for external and internal gripping.

In the control embodying the present invention excessive gripping pressure of the jaws on the work piece is prevented by a unit which functions to stop the motor instantly when the selected predetermined pressure of the jaws on the work piece is reached. This is accomplished by the action of the current flow through a magnet of the unit and which current flow corresponds in value to the selected mechanical pressure of the jaws on the work piece. However, when the motor is started from rest for initiating the chucking part of the cycle there is a high rush of current through the motor due to the lack of counter-electromotive force. This rush of current is generally higher than that which corresponds to the current value for any selected mechanical pressure of the jaws on the work piece. As illustrative of the condition just referred to reference is made to actual tests which have shown that it takes 135 amperes to start a three horse power alternating current electric motor from rest to idling speed. These tests further showed that it took 26 amperes to idle said motor and that a gripping pressure of the chuck jaws upon the work piece of 4500 pounds takes a motor current of 60 amperes.

In accordance with the present invention provision is made for preventing the opening of the motor circuit due to this excessive flow of current when the motor is being started but which will thereafter cause the motor circuit to be opened and the motor to be stopped when the selected predetermined pressure of the jaws on the work piece is reached and corresponding to a current flow which is lower than that which passes through the motor when it is started up from rest.

As previously stated the motor 12 is a three phase alternating current motor and the three current supplying conductors are designated in Fig. 2 by the reference characters 22, 23 and 24. These supply conductors are connected to a switch 25 which may be termed the motor direction switch as its position controls the direction of operation of the motor for external gripping or for internal gripping. This switch for purposes of illustration is indicated as a manually rotatable switch that can be operated to change from one type of gripping to the other and which switch in the normal operation of the machine can be set for one type of gripping and allowed to remain in that condition for the machining of a large number of work pieces. When the character or type of work piece requires it the switch 25 can be changed to the other type of gripping. The switch 25 is not actuated in the usual cycle of operations which is generally repeated again and again for a large number of work pieces. It may be here stated that the effect of turning the movable member of the switch 25 through an arc of 180° from one operative position to the other reverses the motor by changing two of the supply conductors with respect to the motor terminals in the well known manner.

The motor control includes a three phase solenoid operated switch 26 which is actuated when the motor is to be started and is to function for chucking purposes, and also a three phase solenoid operated switch 27 which is actuated when the motor is to be used for releasing the jaws from the work piece and is to be rotated in the reverse direction from that in the chucking operation. These two three phase main switches 26 and 27 are controlled by two manually operated normally open single phase switches 28 and 29, both of which may be push button switches and can be located on the headstock adjacent the handle 18 as indicated in Fig. 1. The push button switch 28 controls the solenoid coil of the three phase switch 26, while the push button switch 29 controls the solenoid of the three phase switch 27. Hence said push button switches control the closure of the switches 26 and 27. The switches 26 and 27 may be opened by gravity and the switches 28 and 29 by springs.

It might be mentioned at this point that there is also utilized in the control of the motor 12 a solenoid operated single phase switch 30 which is normally closed and is opened only during the functioning of the control unit when the selected predetermined pressure of the chuck jaws on the work piece is reached. Additionally, there is employed a single phase switch which forms a part of the control unit referred to and controls the opening of the switch 30 and said switch will be described presently. The circuits between the various switches 25, 26, 27, 28, 29 and 30 and the motor 12 will be traced subsequently. The control unit which was previously referred to and the purpose of which is to open the motor circuit and stop the motor when the selected predetermined pressure has been exerted by the chuck jaws on the work piece will now be described with reference to Fig. 2.

This unit which may be supported in any suitable position with reference to the motor and which, as before stated, is adaptable for a motor arranged either in the chuck body or externally of the chuck body includes a magnet core 31 here shown as U-shaped. Pivoted to one end of the magnet core is an armature 32 which is adapted to move to its open position as determined by an adjustable set screw 33. This movement to open position of the armature 32 is occasioned by gravity assisted by a spring 34 connected to an arm of the armature and adjustable through the medium of an adjusting nut 35. Both the core and the armature are formed of magnetic material and the core carries a winding 36 which may be termed a series winding for a reason to be presently referred to and since said winding has relatively few turns it is a winding of low resistance and low inductance.

Associated with the armature 32 and carried by a suitable support 37 is a pivoted latch 38 which is normally held by a spring 39 in latching position with respect to the armature 32 so as to hold the latter in its lowermost position as illustrated in Fig. 2. This latch is adapted to be moved to releasing position by a magnet having a stationary core and a winding 40 which may be referred to as a shunt winding and is composed of a large number of turns of relatively small wire and therefore (as compared with the coil 36) has a relatively high resistance and a relatively high inductance.

When the latch is moved (by the magnet 40) from its full line position to its dotted line position of Fig. 2 it releases the armature 32, allowing it to be attracted toward the free pole of the magnet core 31 and in doing so it closes a switch 41. The contacts of this switch 41 are connected in series with the winding 42 of a solenoid and when this winding is energized it withdraws a holding pin 43 from a position to release the plunger 44 of switch 30 and allows the switch to open by gravity. A suitable spring or equivalent means normally keeps the holding pin 43 in the path of the plunger 44 of switch 30 thus normally keeping switch 30 closed. The plunger 44 of switch 30 is surrounded by a solenoid winding 45 which, as will be explained presently, is energized when the push button switch 29 is closed so as to again reset the plunger 44 and close the switch 30 thus allowing the holding pin 43 to again move under or come into the path of the plunger 44.

It will be seen by reference to Fig. 2 that when switch 41 is closed it energizes the solenoid winding 42 resulting in the opening of switch 30 and the deenergization of the solenoid winding 46 of the chucking switch 26 which when energized closes said switch 26. The releasing solenoid switch 27 is adapted to be closed by the energization of a solenoid winding 47. As will subsequently appear this winding 47 of the chuck releasing switch 27 will remain energized so long as the operator keeps the push button 29 closed.

The electric circuits will now be traced. Let it be assumed that in Fig. 2 the motor direction switch 25 is in a position for external gripping of the work piece by the chuck jaws. With the switch in the position shown the conductors 22, 23 and 24 will be individually connected to the similarly designated conductors in the motor side of the switch, but when the switch is turned 180° it simply reverses the connections of the supply conductors to two of the terminals of the motor causing the motor to operate in the reverse direction, that is conductors 23 and 24 on the motor side of the switch 11 are reversed. The conductor 22 is connected to one intake terminal of switch 26 and also to one intake terminal of switch 27, and similarly the supply conductors 23 and 24 are each connected to one intake terminal of switch 26 and to one intake terminal of switch 27. The outlet terminals of switches 26 and 27 are connected by three conductors 48, 49 and 50 to the three terminals of the motor 12. It will be understood that so long as the push button switches 28 and 29 are open the motor is deenergized at the solenoid operated gripping and releasing switches 26 and 27.

The intake terminal of the push button switch 28 is connected, in this instance, to supply conductor 22. The opposite terminal of the switch 28 is connected by a conductor 51 to one terminal of the normally closed switch 30 and the other terminal of this switch 30 is connected by a conductor 52 to one terminal of the winding 46 of switch 26, the other terminal of which winding is connected by a conductor 53 to one of the other supply conductors, in this instance the supply conductor 24. Thus when the switch 28 is held closed by the operator the solenoid winding 46 of the chucking switch 26 is connected across two of the supply conductors. On the energization of the solenoid winding 46 of switch 26 this switch is closed and the motor 12 is started. The conductors 49 and 50 are connected directly to two of the terminals of the motor and the other conductor 48 is connected to the third terminal of the motor through the winding 36 of the unit magnet by way of conductors 54 and 55. Thus the coil 36 is directly connected in the motor circuit and is energized so long as the motor is energized and is therefore, as before stated, a series winding.

It will be noted that the conductor 54 which is one of the main conductors supplying current to the motor is connected by a branch conductor 56 to one terminal of the winding 40 of the control unit and the other terminal of this winding is connected by a conductor 57 to the conductor 49 which is another of the current supplying conductors. Accordingly this winding 40 is connected across or in shunt with two of the current supplying conductors for the motor and will be continuously energized so long as the motor is energized, regardless of its direction of rotation.

It will be noted that on the closure of the push button switch 28 the solenoid operated chucking switch 26 is closed and the motor 12 starts from rest. At the same time both the series winding 36 and the shunt winding 40 are energized and although there is a high current surge through the motor and therefore through the winding 36 causing a strong magnetic pull on the armature 32, the movement of the armature toward the free pole of the magnet core 31 is prevented by the holding action of the latch 38. During the brief continuance of this surge the high inductance and the high resistance of the winding 40 prevent a sufficient magnetic pull on the latch to withdraw it from latching engagement with the armature 32. As soon as the surge passes, the motor idles and the current in the series coil 36 is greatly reduced and the magnetization, due to the winding 40, builds up to the point where the latch 38 is withdrawn to its dotted line position in Fig. 2, but at this time due to the weight of the armature and due to the action of the spring 34 the magnetic pull on the armature 32 is not sufficient to cause the armature to be attracted to the free pole of the core 31. Therefore during the idling of the motor 12 while the jaws are being moved toward work gripping position the switch 41 remains open. However, when the jaws engage the work and the pressure on the latter builds up to the selected predetermined pressure the slowing down of the motor causes an increase in the amperage or current value passing through the motor and through the series winding 36 and when the current value builds up to a point corresponding to the selected predetermined pressure of the jaws on the work piece the magnetic pull on the armature 32 has built up to a point such that the armature is attracted to the free pole of the core 31, thus closing the switch 41. The closing of the switch 41 causes the energization of the winding 42, one terminal of said winding being connected by a conductor 58 to supply conductor 22 and the other terminal of said winding 42 being connected through switch 41 and by way of conductor 59 to the supply conductor 24. On the energization of the winding 42 the holding pin 43 is withdrawn and the switch 30 is opened by reason of the fact that the plunger 44 is now free to move to open position by gravity. This immediately deenergizes the winding 46 of the chucking switch 26, regardless of whether the operator keeps the push button switch 28 closed and results in breaking the circuit to the motor 12 and stopping the latter.

The jaws now grip the work piece with the desired pressure and the workman will complete the machining operation on the work piece. After this is completed the motor 12 is started in the reverse direction to release the jaws from the work piece and to do this the operator closes the push button switch 29. One terminal of this switch is connected by way of conductor 60 to one terminal of the winding 47 of the releasing switch 27, the other terminal of said winding 47 being connected to supply conductor 24. This starts the motor 12 in the reverse direction and although the surge of current through the motor again occurs, the latch 38 will prevent movement of the armature 32 toward the free pole 31 of the core as before. The motor 12 will now run in the reverse direction, with the current passing through the motor reduced to a value below that necessary to cause the closure of the switch 41 until the chuck jaws are released. It might be stated that when the releasing push button switch 29 is depressed not only is the winding 47 of the releasing switch 27 energized but there is simultaneously energized the winding 45 of the normally closed switch 30, it being noted that one terminal of this winding 45 is connected by a conductor 61 to supply conductor 24 and the other terminal of said winding 45 is connected by conductor 62 to the conductor 60 and therefore to supply conductor 22. This results in the closure of the switch 30, whereupon the spring will move the holding pin 43 back into holding position with reference to the plunger 44 of said switch 30.

It will be understood that after the jaws have been released from the work piece the motor will continue to retract the jaws to a position to enable the operator to unload the work piece from the chuck, whereupon the operator will release the switch 29 to stop the motor. The circuit is now ready for a repetition of the work gripping cycle and all of the parts are now again in the position shown in Fig. 2.

Attention is called to the fact that were it not for the provision of the latch 38 which restrains the armature 32 when the initial surge through the motor occurs, the switch 41 would be immediately closed when the surge occurs, resulting in the opening of the switch 30 and also the energization of the solenoid winding 46 and the opening of the switch 26, resulting in the stopping of the motor 12. In other words, the motor 12 would start but immediately stop before the jaws could be moved to work gripping position. This disadvantage is entirely overcome by the provision of the latch 38 forming an important part of the control unit.

As previously stated the armature 32 will be attracted to the free pole of the core 31 and the switch 41 will be closed when the value of the current passing through the series coil 36 of the magnet corresponds to the selected pressure of the jaws on the work piece.

It was previously mentioned that the magnet is restrained from moving to a position to close the switch 41, both by the action of gravity and by the tension in the spring 34. For minimum or light gripping pressure of the jaws on the work piece the holding action of the spring will be at a minimum, and for a predetermined heavier pressure the holding action of the spring will be some other value, depending upon the adjustment which is given to the nut 35 which can be adjusted for any desired pressure of the jaws on the work piece up to the maximum pressure permitted by the design of the chuck.

In Fig. 3 there is shown a modified form of control unit wherein the pressure which is to be applied by the jaws to the work piece for either external or internal gripping may be varied in a somewhat different manner than is the case with the control unit shown in Fig. 2. In Fig. 3 there is employed a magnet which comprises a core 31 with its energizing series winding 36, a switch 41, a latch mechanism including a latch 38 controlled by a shunt coil 40 which compared with the series coil 36 has relatively high resistance and relatively high inductance. These parts are similar in construction and function to the corresponding parts of Fig. 2 and accordingly have been given the same reference characters.

In the form shown in Fig. 3 there is employed an armature 63 cooperating with the magnet formed of the core 31 and winding 36 and said armature is pivoted at one end to said core 31. Likewise there is employed an armature support 64 which is also pivoted on the core 31 and which support has an upstanding heel with an adjustable setscrew 65, by which the normal positions of the armature support 64 and armature 63 may be adjusted. At the free end of the armature support 64 is an adjustable setscrew 66 which has a grooved upper end fitting into a notch at the free end of the armature 63, whereby the screw and armature are connected so the armature may be moved relative to its support 64.

By adjusting the position of the set screw 66 the air gap between the armature 63 and the free pole of the magnet may be varied. In this instance the spring 34 of the form of the invention shown in Fig. 2 and which spring determines the value of the current passing through the coil 36 is eliminated and the width of the air gap and the weight of the armature 63 and its support 64 are relied upon to determine this value. In other words, in Fig. 2 the armature 32 when in its lowermost position is separated from the cooperating pole of the magnet 31 by a fixed air gap and the resistance to movement is the weight of the armature plus the adjustment which is given to the spring 34, the spring 34 being the variable element in the adjustment. On the other hand in Fig. 3 the variable element is, as before stated, the air gap determined by the adjustment given to the setscrew 66.

In Fig. 3 the latch 38 normally overlies the free end of the armature support 64 and when the surge occurs in starting the motor from rest the inductance and the resistance of the coil 40 prevent a sufficient value of current passing through the coil 40 to pull the latch from latching engagement with the armature support, but after the surge has passed and the motor is idling, in which such case the jaws are being moved toward work engaging position, the inductance does not as before restrain the value of the current passing through the coil 40, and at the same time the ampere turns of the winding 36 are reduced with a resulting reduction in the magnetic pull on the armature 63 and when the jaws engage the work piece with a predetermined pressure as determined by the adjustment of the setscrew 66, there is sufficient magnetic pull of the magnet on the armature 63 to elevate the same, close the switch 41 and thus stop the motor. The circuit connections will be precisely the same in the form of the invention shown in Fig. 3 as in the arrangement shown in Fig. 2 and therefore a further description of this modification need not be given.

Although different embodiments of the invention have been illustrated and described herein it should be understood that the invention is susceptible of various modifications and adaptations within the scope of the appended claims.

Having thus described my invention, I claim:

1. In combination with a chuck having movable work gripping means and an electric motor for actuating said means, a control for said motor comprising a normally open current supply circuit to the motor, a switch for closing said circuit to energize said motor, means for interrupting said circuit when thus closed to deenergize said motor and responsive automatically to a predetermined value of current passing through said motor and correlated to the gripping pressure of said gripping means, said interrupting means including relatively adjustable elements to vary said predetermined value of current in accordance with different gripping pressures of said gripping means, and means for rendering said interrupting means non-responsive to the current surge in the motor incident to its starting from rest when said current surge is greater in value than said predetermined current value.

2. In combination with a chuck having movable gripping means and an electric motor for actuating said means, a control for said motor comprising a current supply circuit to the motor, a normally open switch for closing said circuit to energize said motor, means for interrupting said circuit when said switch is closed to deenergize said motor and responsive automatically to a predetermined value of current passing through said motor and correlated to the gripping pressure of said gripping means, said interrupting means including a magnet core having a winding of low resistance and low inductance in series with said motor, and an armature cooperating with said core, adjustable means for varying the attractive force required to move said armature toward said core in accordance with different gripping pressures of said gripping means, and means for rendering said interrupting means non-responsive to the current surge in the motor incident to its starting from rest when said current surge is greater in value than said predetermined current value, said last named means including a latch for restraining said armature against movement under the attraction of said magnet core, and a magnet acting on said latch and having a winding of relatively high resistance and relatively high inductance as compared to said series winding.

3. In combination with a chuck having movable gripping means and an electric motor for actuating said means, a control for said motor comprising a current supply circuit to the motor, a normally open switch for closing said circuit to energize said motor, means for interrupting said circuit to deenergize said motor when said switch is closed and responsive automatically to a predetermined value of current passing through said motor and correlated to the gripping pressure of said gripping means, said interrupting means including a magnet core having a winding of low resistance and low inductance in series with said motor, an armature cooperating with said core, and adjustable means for varying the normal air gap between said armature and said core, and means for rendering said interrupting means non-responsive to the current surge in the motor incident to its starting from rest when said current surge is greater in value than said predetermined current value, said last named means including a latch for restraining said armature against movement under the attraction of said magnet core, and a magnet acting on said latch and having a winding of relatively high resistance and relatively high inductance as compared to said series winding.

4. In combination with a chuck having movable gripping means and an electric motor for actuating said means, a control for said motor comprising a current supply circuit to the motor, a normally open switch in said circuit, electromotive means for closing said switch to energize said motor, a normally open switch for controlling said electromotive means, means for interrupting said circuit to deenergize said motor after said first named switch has been closed and responsive automatically to a predetermined value of current passing through said motor and correlated to the gripping pressure of said gripping means, said interrupting means including a control unit also controlling said electromotive means and which unit includes a magnet core having a winding in series with said motor, an armature cooperating with said core, and adjustable means for varying the attractive force required to move said armature toward said core, and means for rendering said interrupting means non-responsive to the current surge in the motor incident to its starting from rest when said current surge is greater in value than said predetermined current value.

5. In combination with a chuck having movable gripping means and an electric motor for actuating said means, a control for said motor comprising a current supply circuit to the motor, a normally open switch in said circuit, electromotive means for closing said switch to energize said motor, a normally open switch for controlling said electromotive means, means for interrupting said circuit to deenergize said motor after said first named switch has been closed and responsive automatically to a predetermined value of current passing through said motor and correlated to the gripping pressure of said gripping means and including a switch also controlling said electromotive means, means normally holding said latter switch closed, electromotive means rendering said latter means inactive, a switch controlling said latter electromotive means, a magnet core having a winding of low resistance and low inductance in series with said motor, an armature cooperating with said core and operable when attracted to the pole thereof to close said last named switch, and adjustable means for varying the attractive force required to move said armature toward said core, and means for restraining said armature against movement during the current surge in the motor incident to its starting from rest when said current surge is greater in value than said predetermined current value, said last named means including a latch cooperating with said armature, and a magnet acting on said latch to withdraw the same and having a winding of relatively high resistance and relatively high inductance as compared to said series winding of said core.

6. In combination with a chuck having movable gripping means and a three-phase alternating current electric motor for actuating said means, a control for said motor comprising a normally open current supply circuit to the motor, a manually operable two-position motor direction switch in said circuit, a three-phase solenoid operated switch in said circuit for starting the operation of said motor in one direction, a three-phase solenoid operated switch in said circuit for starting operation of said motor in the opposite direction, a normally open manually operable switch for controlling said first named solenoid switch, a normally open manually operated switch for controling said second named solenoid switch, a single phase switch normally closed during operation of said motor in said one direction but adapted to be opened when a predetermined current value in the motor is reached to deenergize the solenoid of said first named solenoid switch, said single phase switch being moved to closed position by a solenoid controlled by said second named normally open manually operated switch, a holding member operable automatically on closure of said single phase switch to hold the same in closed position, a solenoid for rendering said holding member inactive, a normally open single phase switch having its contacts in series with the winding of said last named solenoid for controlling its energization, a magnet core having a winding in series with said motor and of low resistance and low inductance, an armature operatively associated with said magnet core and acting on said last named single phase switch to close the same when drawn to the free pole of said magnet core, adjustable means for varying the attractive force required to move said armature toward said core, a spring tensioned latch engageable with said armature to restrain the latter from movement under the attraction of said core, and means for rendering said interrupting means non-responsive to the current surge in the motor incident to its starting from rest when said current surge is greater in value than said predetermined current value and including a magnet arranged to act on said latch and having a shunt winding of relatively high resistance and relatively high inductance as compared to the series winding of said first named magnet.

7. In combination with a chuck having movable gripping means and a reversible electric motor for actuating said means in opposite directions for external or internal gripping, a control for said motor comprising normally open current supply circuits to said motor, switches for selectively closing one or the other of said circuits to energize said motor for operation in either the forward or the reverse direction, means for interrupting the circuit which has been thus closed to deenergize said motor and which means is responsive automatically to a predetermined value of current passing through said motor and correlated to the gripping pressure of said gripping means, and means for rendering said interrupting means non-responsive to the current surge in the motor incident to its starting from rest in either direction when said surge is greater in value than said predetermined current value.

FRED H. BOGART.

REFERENCES CITED

The following references are of record in the file of this patent:

UNITED STATES PATENTS

| Number | Name | Date |
|---|---|---|
| 1,974,249 | Olson | Sept. 18, 1934 |
| 2,180,488 | Van Hamersveld | Nov. 21, 1939 |
| 2,203,233 | Parrish | June 4, 1940 |

FOREIGN PATENTS

| Number | Country | Date |
|---|---|---|
| 406,133 | Great Britain | Feb. 22, 1934 |
| 416,127 | Great Britain | 1934 |